(12) United States Patent
Chen et al.

(10) Patent No.: US 12,739,477 B2
(45) Date of Patent: Sep. 15, 2026

(54) FRAME DROPPING METHOD, SERVER AND MEDIUM

(71) Applicant: BEIJING BYTEDANCE NETWORK TECHNOLOGY CO., LTD., Beijing (CN)

(72) Inventors: Jianping Chen, Beijing (CN); Yongyi Yu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 86 days.

(21) Appl. No.: 18/843,647

(22) PCT Filed: Mar. 3, 2023

(86) PCT No.: PCT/CN2023/079605
§ 371 (c)(1),
(2) Date: Sep. 3, 2024

(87) PCT Pub. No.: WO2023/165608
PCT Pub. Date: Sep. 7, 2023

(65) Prior Publication Data

US 2025/0184579 A1 Jun. 5, 2025

(30) Foreign Application Priority Data

Mar. 4, 2022 (CN) ......................... 202210207969.0

(51) Int. Cl.
*H04N 21/647* (2011.01)
*H04N 19/172* (2014.01)
*H04N 21/262* (2011.01)

(52) U.S. Cl.
CPC ..... *H04N 21/64792* (2013.01); *H04N 19/172* (2014.11); *H04N 21/2625* (2013.01)

(58) Field of Classification Search
CPC ......... H04N 21/64792; H04N 21/2625; H04N 19/172
See application file for complete search history.

(56) References Cited

U.S. PATENT DOCUMENTS 6,061,399 A 5/2000 Lyons et al.
8,363,548 B1 1/2013 Aboul-Magd et al.
(Continued)

FOREIGN PATENT DOCUMENTS

CN 104010032 A 8/2014
CN 104702968 A 6/2015
(Continued)

OTHER PUBLICATIONS

China Patent Application No. 202210207969.0; Office Action; dated Jun. 18, 2024; 11 pages.
(Continued)

*Primary Examiner* — Nicholas T Corbo
(74) *Attorney, Agent, or Firm* — BakerHostetler

(57) ABSTRACT

A frame dropping method and apparatus, a server, and a medium are provided. The method includes: obtaining a current video frame queue currently to be sent; determining a timeout video frame in the current video frame queue, and determining a total number of frames currently to be dropped corresponding to the current video frame queue based on a number of the timeout video frame and a number of frames yet to be dropped; determining a droppable video frame in the current video frame queue; and determining a target droppable video frame from the droppable video frame based on the total number of frames currently to be dropped and a drop priority corresponding to the droppable video frame, and performing frame dropping processing on the target droppable video frame, wherein the drop priority
(Continued)

| I-frame 999 | reference frame 499 | reference frame 499 | non-reference frame 3 | reference frame 496 | non-reference frame 5 | reference frame 494 | I-frame 1999 | reference frame 1499 | reference frame 1498 | non-reference frame 1003 | ... |
|---|---|---|---|---|---|---|---|---|---|---|---|

is determined based on decoding reference information corresponding to the droppable video frame.

20 Claims, 4 Drawing Sheets

(56) References Cited

U.S. PATENT DOCUMENTS

| | | | | |
|---|---|---|---|---|
| 2012/0013748 | A1* | 1/2012 | Stanwood | H04L 47/2408 348/192 |
| 2012/0287338 | A1 | 11/2012 | Fujita et al. | |
| 2017/0347158 | A1* | 11/2017 | Fu | H04N 19/152 |

FOREIGN PATENT DOCUMENTS

| | | | |
|---|---|---|---|
| CN | 107172432 | A | 9/2017 |
| CN | 107231328 | A | 10/2017 |
| CN | 108737818 | A | 11/2018 |
| CN | 109660879 | A | 4/2019 |
| CN | 111385221 | A | 7/2020 |
| CN | 113472680 | A | 10/2021 |
| CN | 113490055 | A | 10/2021 |
| CN | 114567796 | A | 5/2022 |
| CN | 114567796 | B | 11/2024 |

OTHER PUBLICATIONS

International Patent Application No. PCT/CN2023/079605; Int'l Search Report and Written Opinion; dated Jun. 20, 2023; 12 pages.

* cited by examiner

| I-frame 999 | reference frame 499 | reference frame 499 | non-reference frame 3 | reference frame 496 | non-reference frame 5 | reference frame 494 | I-frame 1999 | reference frame 1499 | reference frame 1498 | non-reference frame 1003 | ... |
|---|---|---|---|---|---|---|---|---|---|---|---|

FRAME DROPPING METHOD, SERVER AND MEDIUM

The present disclosure is a U.S. national stage application of International Patent Application No. PCT/CN2023/079605, filed on Mar. 3, 2023, which claims priority of the Chinese Patent Application No. 202210207969.0 filed with the Chinese Patent Office on Mar. 4, 2022, which are incorporated herein by reference in their entireties.

TECHNICAL FIELD

Embodiments of the present disclosure relate to Internet technology, for example, to a frame dropping method and apparatus, server, and medium.

BACKGROUND

With the rapid development of Internet technology, more and more users prefer to watch live videos on clients. Stable low-delay live video can be obtained when the network quality is good. However, in the case of a weak network, the transmission speed of live audio-video data is slow, resulting in video stuttering, waiting, and increased delay. Currently, in order to reduce delay and avoid the occurrence of a blurred screen, continuous video frames, from the current timeout video frame that needs to be dropped to the next key frame, can be dropped collectively. However, this collective frame dropping often causes the server to have no data available to send for some time, thereby wasting bandwidth and also resulting in prolonged freezing of the video for a long period of time, reducing the user viewing experience.

SUMMARY

The embodiments of the present disclosure provide a frame dropping method, apparatus, a server and a medium, to reduce the number of dropped frames and avoid the situation that no data can be sent while ensuring low latency and avoiding a blurred screen, so as to improve the bandwidth utilization as well as the video playback continuity and improve the user viewing experience.

In a first aspect, embodiments of the present disclosure provide a frame dropping method, including:

- obtaining a current video frame queue currently to be sent;
- determining a timeout video frame in the current video frame queue, and determining a total number of frames currently to be dropped corresponding to the current video frame queue based on a number of the timeout video frame and a number of frames yet to be dropped;
- determining a droppable video frame in the current video frame queue; and
- determining a target droppable video frame from the droppable video frame based on the total number of frames currently to be dropped and a drop priority corresponding to the droppable video frame, and performing frame dropping processing on the target droppable video frame, where the drop priority is determined based on decoding reference information corresponding to the droppable video frame.

In a second aspect, embodiments of the present disclosure further provide a frame dropping apparatus, including:

- a current video frame queue obtaining module, configured to obtain a current video frame queue currently to be sent;
- a total number of frames currently to be dropped determining module, configured to determine a timeout video frame in the current video frame queue, and determine a total number of frames currently to be dropped corresponding to the current video frame queue based on a number of the timeout video frame and a number of frames yet to be dropped;
- a droppable video frame determining module, configured to determine a droppable video frame in the current video frame queue; and
- a frame dropping processing module, configured to determine a target droppable video frame from the droppable video frame based on the total number of frames currently to be dropped and a drop priority corresponding to the droppable video frame, and perform frame dropping processing on the target droppable video frame, where the drop priority is determined based on decoding reference information corresponding to the droppable video frame.

In a third aspect, embodiments of the present disclosure further provides a server, including:

- at least one processor;
- a memory, configured to store at least one program;
- the at least one program, when executed by at least one processor, causes at least one processor to implement the frame dropping method as provided by any embodiment of the present disclosure.

In a fourth aspect, embodiments of the present disclosure further provides a computer-readable storage medium having stored thereon a computer program which, when executed by a processor, implements the frame dropping method as provided by any embodiment of the present disclosure.

BRIEF DESCRIPTION OF DRAWINGS

In the drawings throughout, same or similar drawing reference signs represent same or similar elements. It should be understood that the drawings are schematic, and originals and elements may not necessarily be drawn to scale.

DETAILED DESCRIPTION

Embodiments of the present disclosure will be described in more detail below with reference to the drawings.

It should be understood that the various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "at least one."

The names of the messages or information exchanged between a plurality of apparatuses in the embodiments of the present disclosure are for illustrative purposes only and are not intended to limit the scope of these messages or information.

Embodiment One

Figures 1, 2:
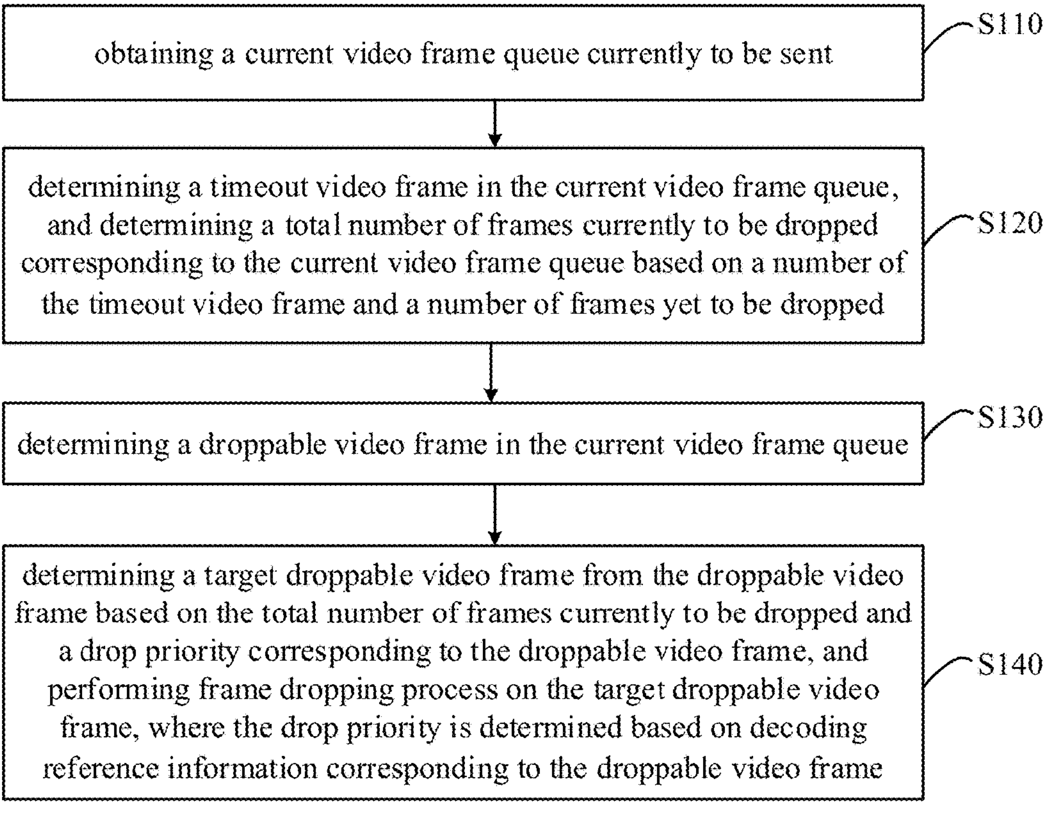
FIG. 1 is a flowchart of a frame dropping method provided by embodiment one of the present disclosure.
FIG. 2 is an example of determining a drop priority provided by embodiment one of the present disclosure.

FIG. 1 is a flowchart of a frame dropping method provided by embodiment one of the present disclosure, which may be applicable to situations in which frame dropping is performed during video transmission to ensure low latency, especially in application to live streaming scenarios in which frame dropping is performed on live video to be transmitted. The method may be performed by a frame dropping apparatus, which may be implemented by means of software and/or hardware, integrated into a server. As shown in FIG. 1, the method includes the following steps:

S110: obtaining a current video frame queue currently to be sent.

Illustratively, the server may encode the current video to be sent using thread A and write the encoded video frames in turn into a video frame queue to be sent. For example, in a live streaming scenario, the live video received in real-time may be encoded and the encoded video frames sequentially written into the video frame queue to be sent. The video frame queue to be sent in embodiments of the present disclosure is dynamically changing over time. The server may obtain a current video frame queue to be sent at the current moment in real-time or periodically with another thread B, to send each video frame in the current video frame queue to the client in sequence, and remove the successfully transmitted video frames from the video frame queue, while subsequently performing frame dropping processing on the video frames that have not been sent due to poor network, to ensure low latency of the video.

S120: determining a timeout video frame in the current video frame queue, and determining a total number of frames currently to be dropped corresponding to the current video frame queue based on a number of the timeout video frame and a number of frames yet to be dropped.

The timeout video frame may refer to a video frame in which the duration between the current moment and a start-sending moment exceeds a preset latency. The preset latency may be an allowed video delay maximum duration set in advance based on traffic demand and scenario. A start-sending moment may refer to a moment when a video frame is allowed to start sending to maintain real-time synchronization of the video. The number of frames yet to be dropped may refer to the number of frames that should be dropped until the current moment, but have not yet been dropped. For example, a previous video frame queue should drop 10 frames, but only 3 frames are actually dropped, so the number of frames yet to be dropped is 7 frames, thereby requiring 7 more frames to be dropped in the current video frame queue in order to ensure low latency. The total number of frames currently to be dropped may refer to the total number of video frames in the current video frame queue that need to be dropped, so as to avoid the delay duration of the video exceeding the preset latency, ensuring low latency of the video.

Illustratively, for each video frame currently to be sent in the current video frame queue, it may be detected whether the current moment exceeds a current timeout moment corresponding to the video frame, and if so, the video frame is determined to be a timeout video frame. The initial value of the current timeout moment corresponding to the video frame may be determined based on the start-sending moment of the video frame and the preset latency. Adding the number of all the timeout video frames in the current video frame queue and the number of frames yet to be dropped, and determining the adding result as the total number of frames currently to be dropped in the current video frame queue.

S130: determining a droppable video frame in the current video frame queue.

The droppable video frame may refer to a video frame in the current video frame queue that can be dropped while avoiding the appearance of a blurred screen.

Illustratively, when encoding a video frame, the video frame may be encoded as a key frame (I.e., I-frame), a forward predictive coded frame (I.e., P-frame), or a bi-directional predictive coded frame (I.e., B-frame), where the I-frame is decoded using only the information of the key frame itself, without reference to other video frames. The interval between two I-frames is long. A P-frame needs to be decoded with reference to information from a video frame prior to the current frame. If the video frame to which the P-frame is referred is lost, it will lead to a blurred screen phenomenon. A B-frame needs to be decoded with reference to video frames before and after the current frame. If the video frames to which the B-frame is referred are lost, it will also lead to a blurred screen phenomenon. Based on this characteristic of video frame encoding, embodiments of the present disclosure may detect whether there is at least one key frame in the current video frame queue and whether the last key frame in the queue is a first-in-queue frame, and determine a droppable video frame in the current video frame queue based on the detection result.

For example, if it is detected that at least one key frame is present in the current video frame queue and that a last key frame is not a first-in-queue frame, treating each video frame before the last key frame in the current video frame queue as the droppable video frame. If it is detected that no key frame exists in the current video frame queue or that only one key frame that exists is the first-in-queue frame, the operation of step S110 may be returned to wait until it is detected that at least one key frame exists in the current video frame queue and the last key frame is not the first-in-queue frame in order to start a subsequent frame dropping operation after the next I-frame is written into the queue.

As another example, if it is detected that there is no key frame in the current video frame queue, or that only one key frame that exists is the first-in-queue frame, a frame drop operation may be made early by predicting the number of remaining video frames in the current Group of Pictures (GOP) the current video frame queue that has not yet written to the queue, I.e., a subsequent frame drop operation is triggered before the next I-frame is written to the queue.

S140: determining a target droppable video frame from the droppable video frame based on the total number of frames currently to be dropped and a drop priority corresponding to the droppable video frame, and performing frame dropping processing on the target droppable video frame, where the drop priority is determined based on decoding reference information corresponding to the droppable video frame.

The drop priority may be used to characterize the corresponding drop order of the droppable video frame to minimize the number of dropped frames while avoiding the occurrence of a blurred screen. Embodiments of the present disclosure may utilize numerical values to characterize the high and low levels of the drop priority. For example, the lower the drop priority of a video frame, i.e., the smaller the numerical value, indicates that the video frame can be dropped more preferentially. The decoding reference information corresponding to the droppable video frame may be the information indicating whether other video frames need to refer to the droppable video frame when decoding other video frames. For example, if the information of the droppable video frame does not need to be referenced when decoding other video frames, the droppable video frame is determined to be a non-reference frame. If the non-reference frame is dropped, the decoding of other video frames will not be affected, so that a blurred screen will not appear. If the information of the droppable video frame needs to be referenced when decoding other video frames, the droppable video frame is determined to be a reference frame. If the reference frame is dropped, the decoding of other video frames will be affected. Since the reference frame is often referenced by the following video frames, the drop priority of the reference frame located further after can be set lower so that the later reference frame can be dropped more preferentially, thereby avoiding the presence of a blurred screen.

Illustratively, for a congestion control algorithm based on bandwidth probing, such as a Bottleneck Bandwidth and Round-trip propagation time (BBR) algorithm, the collective frame dropping tends to result in no data being sent for some time, thereby also making the detection result of bandwidth smaller, thereby reducing the data transmission rate. A lower data transmission rate triggers frame dropping again when sending less data, which may eventually result in an avalanche and affect the user's viewing experience. The embodiments of the present disclosure, based on the drop priority corresponding to each droppable video frame, can determine a target droppable video frame that needs to drop at present from the respective droppable video frame and perform frame dropping processing on the respective target droppable video frame, thereby reducing the number of dropped frames without collective frame dropping in the case of ensuring low latency and avoiding the appearance of a blurred screen, and at the same time avoiding the situation that no data sent, avoiding an avalanche occurs, improving the bandwidth utilization, improving the consistency of the video playing, and improving the user viewing experience.

It should be noted that if the number of the droppable video frame in the current video frame queue is less than the total number of frames currently to be dropped, indicating that the total number of video frames cannot be dropped in this frame dropping operation, i.e., the current video frame queue cannot meet the frame dropping requirement, the remaining frames not dropped in this frame dropping operation can be dropped in the following video frame queue to ensure low latency of the video.

Exemplarily, after S140 may further include: determining and updating the number of frames yet to be dropped based on the total number of frames currently to be dropped and the number of the target droppable video frame. For example, the difference between the total number of frames currently to be dropped minus the number of the target droppable video frame may be determined as the number of frames yet to be dropped, so as to perform frame dropping processing in the following frame dropping operation, thereby ensuring low latency of the video.

The technical solution of the embodiments of the present disclosure does not directly drop frames after determining the timeout video frame in the current video frame queue currently to be sent, but based on the number of the timeout video frame and the number of frames yet to be dropped, determines the total number of frames currently to be dropped corresponding to the current video frame queue, i.e., the total number of frames that need to be dropped in order to ensure low latency. By determining the droppable video frame in the current video frame queue, and determining the target droppable video frame from the respective droppable video frames based on the drop priority and the total number of frames currently to be dropped determined by the decoding reference information corresponding to the droppable video frames, and performing the frame dropping process, it is possible to eliminate the need to perform collective frame dropping, reduce the number of dropped frames without collective frame dropping in the case of ensuring low latency and avoiding the appearance of a blurred screen, avoid the situation that no data sent, improve the bandwidth utilization, and further improve the consistency of the video playing, and improve the user viewing experience.

On the basis of the above-mentioned technical solution, after "determining a timeout video frame in the current video frame queue" in step S120, it may further include: performing a delay processing on a current timeout moment corresponding to the timeout video frame based on a preset delay duration, and updating the current timeout moment.

Exemplarily, the current timeout moment corresponding to each timeout video frame may be delayed by a preset delay duration, and the moment delayed may be used as an updated current timeout moment, so that the timeout video frame may be shifted from a timeout state to a non-timeout state, so that when the timeout video frame in the current video frame queue is not dropped as the target droppable video frame, i.e., the timeout video frame may also exist in the next video frame queue, it may be redetermined whether the video frames are the timeout video frame in the next video frame queue by delaying the current timeout moment, thereby obtaining the total number of frames that need to be dropped while ensuring the low latency, thereby achieving the low latency of the video.

On the basis of the above-mentioned technical solutions, the embodiments of the present disclosure may determine the corresponding drop priority in real-time based on the decoding reference information corresponding to each droppable video frame after determining the droppable video frame in the current video frame queue in thread B. If the drop priority corresponding to one droppable video frame has been determined last time, it may not be necessary to re-determine the drop priority corresponding to the droppable video frame this time. The embodiments of the present disclosure may further before writing an encoded video frame into the video frame queue to be sent in thread A, determine the drop priority corresponding to each video frame in advance uniformly based on the decoding reference information corresponding to the encoded video frame, and obtain the drop priority corresponding to each droppable video frame in the current video frame queue based on the predetermined drop priority corresponding to each video frame.

The triggering moments of the above-mentioned two kinds of determining operations of drop priority are different, but the determining process is the same. The embodiment of the present disclosure describes the determining process of drop priority in detail taking the first triggering manner as an example. For example, determining the drop priority based on decoding reference information corresponding to the droppable video frame may include: if the droppable video frame is a key frame, determining the drop priority corresponding to the droppable video frame based on a preset key frame priority determination manner; if the droppable video frame is a reference frame, determining the drop priority corresponding to the droppable video frame based on a preset reference frame priority determination manner; if the droppable video frame is a non-reference frame, determining the drop priority corresponding to the droppable video frame based on a preset non-reference frame priority determination manner. The key frame, when decoded, only needs to utilize its information and does not need to refer to other video frames, and yet, the other video frames, when decoded, may need to refer to the key frame or may not need to refer to the key frame. The reference frame may refer to a video frame that is referenced by other video frames during their decoding, and the reference frame itself may require referencing of other video frames for its own decoding. The non-reference frame may refer to a video that is not referenced by other video frames during their decoding, and yet, the non-reference frame itself may require referencing of other video frames for its own decoding.

Illustratively, whether each droppable video frame is a key frame, a reference frame, or a non-reference frame may be sequentially detected in a sequential order of the droppable video frame in the queue, and the drop priority corresponding to each droppable video frame may be determined based on the determination manner corresponding to the detection result.

Illustratively, in a same group of pictures, the key frame corresponds to a highest drop priority, the reference frame corresponds to a next drop priority, and the non-reference frame corresponds to a lowest drop priority; in the same group of pictures, a plurality of reference frames correspond decreasing drop priorities and a plurality of non-reference frames correspond to increasing drop priorities; key frames in different groups of pictures correspond to increasing drop priorities. For example, for each reference frame in the same group of pictures, the respective drop priorities may be sequentially decremented based on their arrangement order. For each non-reference frame in the same group of pictures, the respective drop priorities may be sequentially incremented based on their arrangement order. For key frames in different groups of images, the respective drop priorities may be sequentially incremented based on the arrangement order of the groups of images. By setting the drop priority as described above, it is possible to guarantee that the non-reference frame is preferentially dropped in the same group of pictures GOP and then the reference frame is dropped, and that the dropped frames occur as much as possible at the end of each group of pictures GOP, so that the video frames leading in each group of pictures GOP have more opportunities to send, avoid the situation of no data transmission, and avoid the situation of shots as much as possible, improving the user's viewing experience.

Exemplarily, determining the drop priority corresponding to the droppable video frame based on the preset key frame priority determination manner may include: determining the drop priority corresponding to the droppable video frame based on the number of current picture groups corresponding to the droppable video frame, a first preset reference value and a second preset reference value.

When the current droppable video frame is a key frame, the number of current picture groups Topcoat may refer to the number of group of pictures GOP generated before the droppable video frame, i.e., the number of key frame generated before the droppable video frame. The initial value of the number of current image groups is 0, and the number of current image groups can be counted with one counter. The first preset reference value GOPPriority may be set in advance for characterizing a difference value between two drop priorities corresponding to key frames in adjacent two groups of pictures GOP. The second preset reference value KeyframePriority may be set in advance for characterizing an initial value of the drop priority corresponding to the key frame, and the initial value may refer to the drop priority corresponding to the key frame in the first group of pictures. The first preset reference value GOPPriority and the second preset reference value KeyframePriority may each be determined based on the number of video frames contained in the group of pictures GOP, and the first preset reference value is greater than the second preset reference value to avoid determining the same drop priority.

Exemplarily, the number of current picture groups GOPCount may be multiplied with the first preset reference value GOPPriority, and the multiplication result is added with the second preset reference value KeyframePriority, and the obtained addition result (i.e., GOPCount×GOPPriority+KeyframePriority) is taken as the drop priority corresponding to the droppable video frame. The number of current picture groups GOPCount may be incremented by one when determining the drop priority corresponding to the next key frame.

Exemplarily, determining the drop priority corresponding to the droppable video frame based on the preset reference frame priority determination manner may include: determining the drop priority corresponding to the droppable video frame based on the number of current picture groups corresponding to the droppable video frame, the frame sequence number of the group of pictures GOP in which the droppable video frame is located, the first preset reference value, and a third preset reference value.

When the current droppable video frame is the reference frame, the number of current picture groups GOPCount may refer to the number of group of pictures GOPs generated before the group of pictures GOP in which the droppable video frame is located, that is, the number of current picture groups GOPCount corresponding to the key frame in the group of pictures GOP in which the droppable video frame is located. The frame sequence number FrameInGOP of the group of pictures GOP in which the droppable video frame is located may be used to characterize which video frame it is in the group of pictures GOP. The initial value of the frame sequence number may be 0, and the frame sequence number may be counted using a counter. The third preset reference value RefFramePriority may be set in advance for characterizing an initial value of the drop priority corresponding to the reference frame, and the initial value may refer to the drop priority corresponding to the first reference frame in the first group of pictures. The third preset reference value may be determined based on the number of the reference frame included in the group of pictures GOP to avoid determining a duplicate drop priority.

Exemplarily, when the current droppable video frame is the reference frame, the number of current picture groups GOPCount may be multiplied with the first preset reference value GOPPriority, and the multiplication result may be added with the third preset reference value RefFramePriority, and the addition result may be subtracted with the frame sequence number FrameInGOP, and the obtained difference (i.e., GOPCount×GOPPriority+RefFramePriority−FrameInGOP) may be used as the drop priority corresponding to the droppable video frame. The frame sequence number FrameInGOP may be incremented by one when determining the drop priority corresponding to the next video frame in the GOP.

Exemplarily, determining the drop priority corresponding to the droppable video frame based on the preset non-reference frame priority determination manner may include: determining the drop priority corresponding to the droppable video frame based on the number of current picture groups corresponding to the droppable video frame, the frame sequence number of the group of pictures GOP in which the droppable video frame is located, and the first preset reference value.

Exemplarily, when the current droppable video frame is a non-reference frame, the number of current picture groups GOPCount may be multiplied with the first preset reference value GOPPriority, and the multiplication result is added with the frame sequence number FrameInGOP, and the obtained addition result (i.e., GOPCount× GOPPriority+FrameInGOP) is taken as the drop priority corresponding to the droppable video frame. The frame sequence number FrameInGOP may be incremented by one when determining the drop priority corresponding to the next video frame in the GOP.

For example, FIG. 2 shows an example of determining a drop priority. As shown in FIG. 2, the first video frame is a key frame in the generated first group of pictures, and when the first preset reference value GOPPriority is 1000, the second preset reference value KeyframePriority is 999, and the third preset reference value RefFramePriority is 500, the drop priority for each video frame in the queue determined in the above-mentioned manner is shown by the numerical values identified in FIG. 2. By performing frame dropping processing based on the determined drop priority, it is possible to guarantee that the dropped frames occur as much as possible at the end of each group of pictures GOP, so that the video frames leading in each group of pictures GOP have more opportunities to send, avoid the situation of no data transmission, and avoid the situation of shots as much as possible, improving the user's viewing experience.

Example Two

Figure 3:
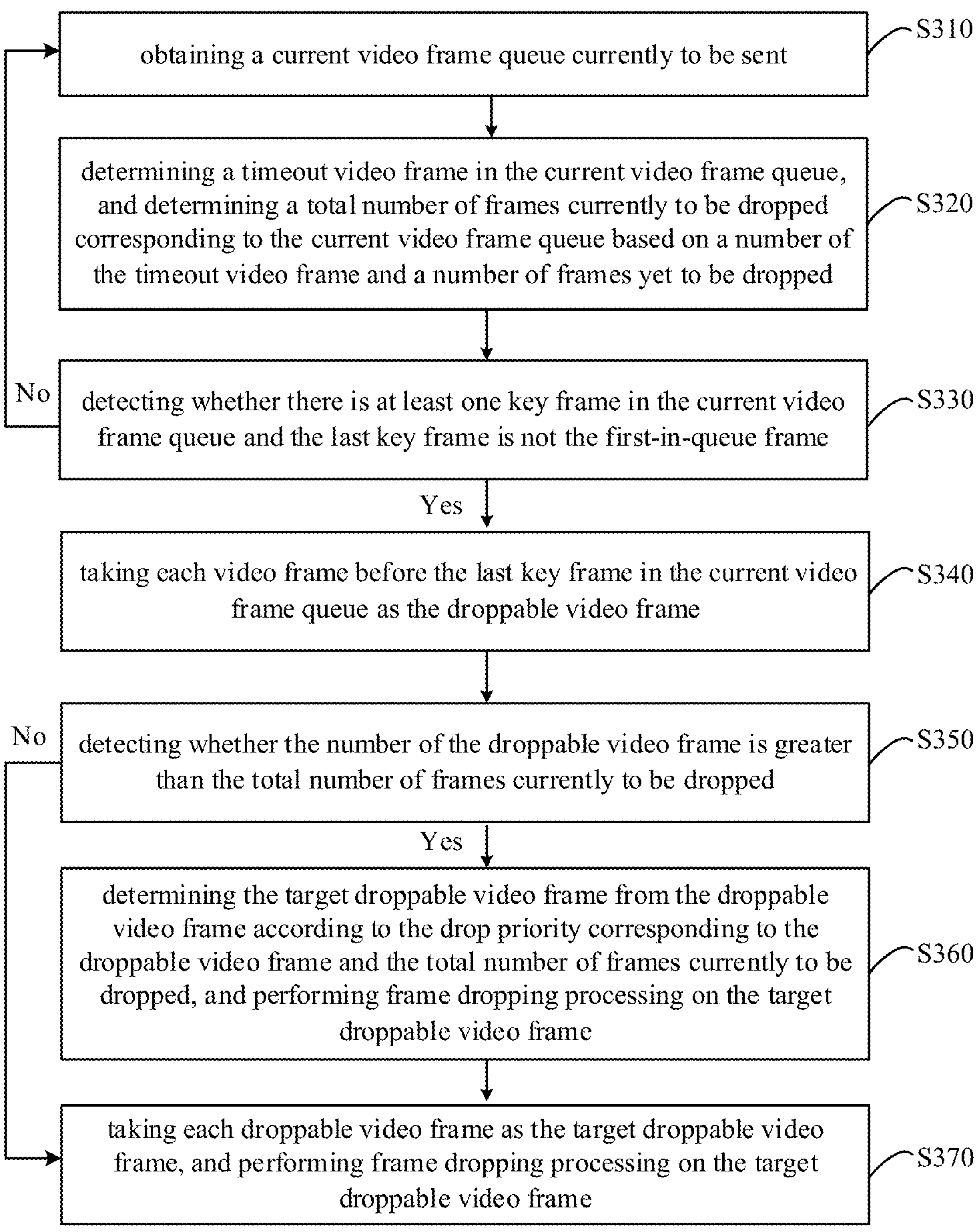
FIG. 3 is a flowchart of a frame dropping method provided by embodiment two of the present disclosure.

FIG. 3 is a flowchart of a frame dropping method provided by embodiment two of the present disclosure, which triggers a frame dropping operation after the next key frame is written into the queue based on the above-mentioned embodiments, and describes the frame dropping processing in detail. Explanations of the terms therein, which are the same as or corresponding to the above-mentioned embodiments, are not repeated herein.

Referring to FIG. 3, the frame dropping method provided by an embodiment of the present disclosure includes the following steps:

S310: obtaining a current video frame queue currently to be sent.

S320: determining a timeout video frame in the current video frame queue, and determining a total number of frames currently to be dropped corresponding to the current video frame queue based on a number of the timeout video frame and a number of frames yet to be dropped.

S330: detecting whether there is at least one key frame in the current video frame queue and whether the last key frame is not the first-in-queue frame; in a case where it is detected that there is at least one key frame in the current video frame queue, and the last key frame is not the first-in-queue frame, proceeding to step S340; in a case where it is detected that no key frame exists in the current video frame queue, or that only one key frame exists is the first-in-queue frame, proceeding to step S310.

Illustratively, by detecting whether there is at least one key frame in the current video frame queue, and whether the last key frame is not the first-in-queue frame, it may be determined whether the next key frame is written in the current video frame queue, i.e., whether the current group of pictures in the current video frame queue is written, and thus whether a subsequent frame dropping operation may be triggered. For example, if it is detected that there are no key frame in the current video frame queue, or that only one key frame that exists is the first-in-queue frame, it is possible to wait by returning to the operation of step S310 until it is detected that there is at least one key frame in the current video frame queue, and the last key frame is not the first-in-queue frame, so that a subsequent frame dropping operation can be started after the next I-frame is written into the queue, thereby avoiding the occurrence of a blurred screen due to the frame dropping operation.

S340: taking each video frame before the last key frame in the current video frame queue as the droppable video frame.

Illustratively, when it is detected that there is at least one key frame in the current video frame queue, and the last key frame is not the first-in-queue frame, indicating that there are at least two key frames in the current video frame queue, or when there is only one key frame and the key frame is not the first-in-queue frame, each video frame before the last key frame in the current video frame queue may be subsequently dropped as a droppable video frame in order to avoid increased delay and a blurred screen.

S350: detecting whether the number of the droppable video frame is greater than the total number of frames currently to be dropped; in a case where it is detected that the number of the droppable video frame is greater than the total number of frames currently to be dropped, proceeding to step S360; and in a case where it is detected that the number of the droppable video frame is less than or equal to the total number of frames currently to be dropped, proceeding to step S370.

S360: determining the target droppable video frame from the droppable video frame according to the drop priority corresponding to the droppable video frame and the total number of frames currently to be dropped, and performing frame dropping processing on the target droppable video frame.

Exemplarily, when the number of droppable video frames is larger than the total number of frames currently to be dropped, target dropped video frames with a number equal to the total number of frames currently to be dropped that need to be dropped preferentially are determined from the respective droppable video frame based on the drop priority corresponding to each droppable video frame, and the respective target droppable video frame is performed the frame dropping process, thereby reducing the number of dropped frames in the case of ensuring low latency and avoiding the appearance of a blurred screen, avoiding the situation that no data sent, improving the bandwidth utilization, and further improving the consistency of the video playing, and improving the user viewing experience.

Exemplarily, S360 may include: ranking a drop order of the droppable video frame based on the drop priority corresponding to the droppable video frame, and taking the droppable video frame dropped first with a number equal to the total number of frames currently to be dropped as the target droppable video frame.

Exemplarily, the respective drop priority corresponding to the respective droppable video frame may be arranged in ascending order from low to high, the respective droppable video frame sequentially arranged in the dropping order is obtained, and after the arrangement, the droppable video frame located at the front with the number equal to the total number of frames currently to be dropped is subjected to dropping frame processing as the target dropping video frame. Embodiments of the present disclosure may also remove the droppable video frame with the highest dropping priority from the set of droppable video frames to become a video frame that does not need to be dropped at this time, and update the number of the current droppable video frame, and return to performing the operation of S350 based on the updated number of droppable video frame until the number of the droppable video frame is equal to the total number of frames currently to be dropped, thereby screening out each target droppable video frame that needs to be dropped at this time.

S370: taking each droppable video frame as the target droppable video frame, and performing frame dropping processing on the target droppable video frame.

Exemplarily, when the number of droppable video frame is less than or equal to the total number of frames currently to be dropped, each droppable video frame in the current video frame queue may be dropped as the target dropped video frame directly in order to ensure low latency of the video.

It should be noted that when the number of droppable video frame is less than the total number of frames currently to be dropped, indicating that the total number of video frames cannot be dropped in this frame dropping operation, i.e., the current video frame queue cannot meet the frame dropping requirement, the remaining frames not dropped in this frame dropping operation can be dropped in the following video frame queue to ensure low latency of the video.

The technical solution of the embodiments of the present disclosure, by taking each video frame before the last key frame in the current video frame queue as the droppable video frame when it is detected that there is at least one key frame in the current video frame queue, the last key frame being not the first-in-queue frame, and determining a target droppable video frame from the respective droppable video frame and performing frame dropping processing based on the number of the droppable video frame and the total number of frames currently to be dropped, can start to perform the frame dropping operation after the next key frame is written into the queue, thereby reducing the number of dropped frames in the case of ensuring low latency and avoiding the appearance of a blurred screen, avoiding the situation that no data sent, improving the bandwidth utilization, and further improving the consistency of the video playing, and improving the user viewing experience.

Example Three

Figure 4:
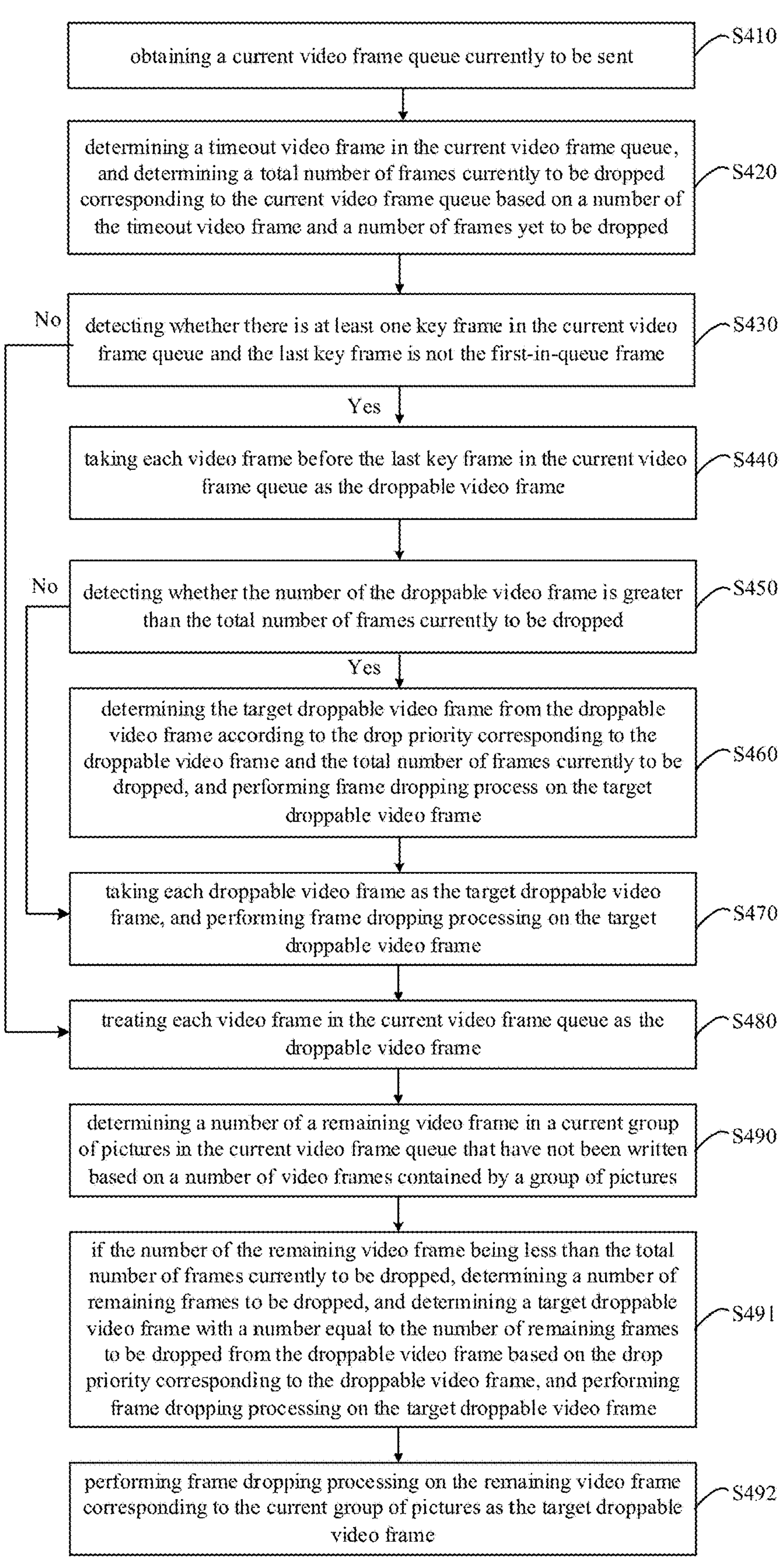
FIG. 4 is a flowchart of a frame dropping method provided by embodiment three of the present disclosure.

FIG. 4 is a flowchart of a frame dropping method provided by embodiment three of the present disclosure, which triggers the frame dropping operation before the next key frame is written into the queue, and describes the process of dropping the frame in advance in detail, based on the above-mentioned embodiments. Explanations of the terms therein, which are the same as or corresponding to the above-mentioned embodiments, are not repeated herein.

Referring to FIG. 4, the frame dropping method provided by the embodiment of the present disclosure includes the following steps:

S410: obtaining a current video frame queue currently to be sent.

S420: determining a timeout video frame in the current video frame queue, and determining a total number of frames currently to be dropped corresponding to the current video frame queue based on a number of the timeout video frame and a number of frames yet to be dropped.

S430: detecting whether there is at least one key frame in the current video frame queue and whether the last key frame is not the first-in-queue frame; in a case where it is detected that there is at least one key frame in the current video frame queue, and the last key frame is not the first-in-queue frame, proceeding to step S440; in a case where it is detected that no key frame exists in the current video frame queue, or that only one key frame exists is the first-in-queue frame, proceeding to step S480.

S440: taking each video frame before the last key frame in the current video frame queue as the droppable video frame.

Illustratively, when it is detected that there is at least one key frame in the current video frame queue, and the last key frame is not the first-in-queue frame, indicating that the next key frame has been written to the queue, a frame dropping operation may be performed by performing steps S440-S470.

S450: detecting whether the number of the droppable video frame is greater than the total number of frames currently to be dropped; in a case where it is detected that the number of the droppable video frame is greater than the total number of frames currently to be dropped, proceeding to step S460; and in a case where it is detected that the number of the droppable video frame is less than or equal to the total number of frames currently to be dropped, proceeding to step S470.

S460: determining the target droppable video frame from the droppable video frame according to the drop priority corresponding to the droppable video frame and the total number of frames currently to be dropped, and performing frame dropping processing on the target droppable video frame.

S470: taking each droppable video frame as the target droppable video frame, and performing frame dropping processing on the target droppable video frame.

S480: treating each video frame in the current video frame queue as the droppable video frame.

Illustratively, in the same video stream, such as the same live stream, the number of video frames within each group of pictures GOP is the same. Thus, by predicting the number of the remaining video frame within the group of pictures GOP that have not been written to the queue, frame dropping can be performed in advance before the next frame is written to the queue. When performing frame dropping in advance, all the video frames in the current group of pictures GOP that have not been written to the queue need to be discarded until the next key frame is written.

For example, when it is detected that no key frame exists in the current video frame queue, or that only one key frame exists as the first-in-queue frame, indicating that the next key frame has not been written to the queue, that is, the current group of pictures GOP in the current video frame queue has not yet been written to the queue, each video frame in the current video frame queue may be treated as the droppable video frame, which will be dropped in advance.

S490: determining a number of a remaining video frame in a current group of pictures in the current video frame queue that have not been written based on a number of video frames contained by a group of pictures.

For example, the number of video frames in the current group of pictures already written to the current video frame queue can be subtracted from the number of video frames contained in the group of pictures GOP, and the resulting difference is determined as the number of the remaining video frame not yet written to the current group of pictures.

Note that the present embodiment does not limit the sequence of execution of steps S480 and S490. For example, step S480 may be executed first and then step S490 may be executed, or step S490 may be executed first and then step S480 may be executed.

S491: if the number of the remaining video frame being less than the total number of frames currently to be dropped, determining a number of remaining frames to be dropped, and determining a target droppable video frame with a number equal to the number of remaining frames to be dropped from the droppable video frame based on the drop priority corresponding to the droppable video frame, and performing frame dropping processing on the target droppable video frame, and proceeding to S492.

Exemplarily, by detecting whether the number of remaining video frames in the current group of pictures (GOP) that has not been written to the queue is less than the total number of frames currently to be dropped, it can be determined whether there is a need to drop more frames in the current video frame queue after dropping the remaining video frame as target droppable video frame in order to ensure low latency of the video. When the number of the remaining video frame is less than the total number of frames currently to be dropped, indicating that additional frames are needed to be dropped in the current video frame queue, then the number of the remaining video frame may be subtracted from the total number of frames currently to be dropped, and the obtained difference is determined as the number of remaining frames to be dropped, i.e., the number of frames to be dropped in the current video frame queue. Based on a drop priority corresponding to each droppable video frame in the current video frame queue, the target droppable video frame with a number equal to the number of remaining frames to be dropped that need to be preferentially dropped is determined from the respective droppable video frame, and frame dropping processing is performed on the respective target droppable video frame. The process of determining the target droppable video frame based on the drop priority can be referred to the related description of the above-mentioned embodiments, and will not be repeated here.

Note that if the number of the remaining video frame is equal to the total number of frames currently to be dropped, it indicates that the effect of low latency can be achieved by dropping the remaining video frame, then the frame dropping processing can be performed on all the remaining video frame as the target droppable video frame by performing S492. If the number of the remaining video frame is larger than the total number of frames currently to be dropped, it indicates that there are more remaining video frames that have not been written, then it is possible to stop the present frame dropping processing and proceed to the next frame dropping processing by returning to the operation of S410, so as to avoid the possibility of a blurred screen due to the present direct frame dropping process, and to improve the consistency of the video play.

S492: performing frame dropping processing on the remaining video frame corresponding to the current group of pictures as the target droppable video frame.

Exemplarily, by directly determining the remaining video frame in the current group of pictures that have not been written to the queue as the target droppable video frame and performing the frame dropping process, the frame dropping processing can be performed in advance on the video frame, the frame dropping efficiency is improved without waiting for the next key frame to be written in the queue, and further, the consistency of the video play is also improved, and the user viewing experience is improved.

Exemplarily, S492 may include: determining a maximum drop priority (i.e., highest drop priority) of the target droppable video frame with the number equal to the number of remaining frames to be dropped; if a drop priority corresponding to a video frame that is newly received being less than the maximum drop priority, determining that the video frame is the remaining video frame corresponding to the current group of pictures and inhibiting the video frame from being written into a video frame queue to be sent.

Illustratively, the remaining video frame in the current group of pictures that have not been written may be determined by tagging the remaining video frame that has not been written or based on the drop priority, and frame dropping processing may be performed on the remaining video frame by disabling writing the remaining video frame to the queue. For example, if the drop priority corresponding to each video frame is determined before the video frame is written to the queue (as implemented in thread A), the maximum drop priority among the target droppable video frame corresponding to the number of remaining frames to be dropped may be determined (as implemented in thread B) when the frame dropping processing are performed at S491. When a newly encoded video frame is received in thread A and the drop priority of the video frame is determined, it may be detected whether the drop priority corresponding to the video frame is less than the maximum drop priority. Upon detecting that the drop priority corresponding to the video frame is less than the maximum drop priority, the video frame is the remaining video frame in the current group of pictures that has not been written, frame dropping processing can then be performed more conveniently by inhibiting the video frame from being written into the video frame queue to be sent, ensuring low latency of the video. If the video frame corresponds to the drop priority greater than the maximum drop priority, indicating that the video frame is not the remaining video frame, the video frame may be written to the video frame queue to be sent for the next frame dropping processing.

The technical solution of the embodiments of the present disclosure, by taking each video frame in the current video frame queue as the droppable video frame when it is detected that no key frame exists in the current video frame queue, or that only one key frame exists is the first-in-queue frame, and when the number of remaining video frame in the current group of pictures that has not been written to the queue is less than the total number of frames currently to be dropped, determining the target droppable video frame corresponding to the number of remaining frames to be dropped from the droppable video frame based on the drop priority corresponding to the droppable video frame, and performing frame dropping processing on the target droppable video frame, and performing frame dropping processing on the remaining video frame corresponding to the current group of pictures as the target droppable video frame, can perform frame dropping processing in advance on the video frame, so the frame dropping efficiency is improved without waiting for the next key frame to be written in the queue, and further, the consistency of the video play is also improved, and the user viewing experience is improved.

The following is an embodiment of a frame dropping apparatus provided by an embodiment of the present disclosure, the apparatus belonging to the same inventive concept as the frame dropping method of the above-mentioned embodiment, for details not described in detail in the embodiment of the frame dropping apparatus, reference may be made to the frame dropping method of the above-mentioned embodiment.

Example Four

Figure 5:
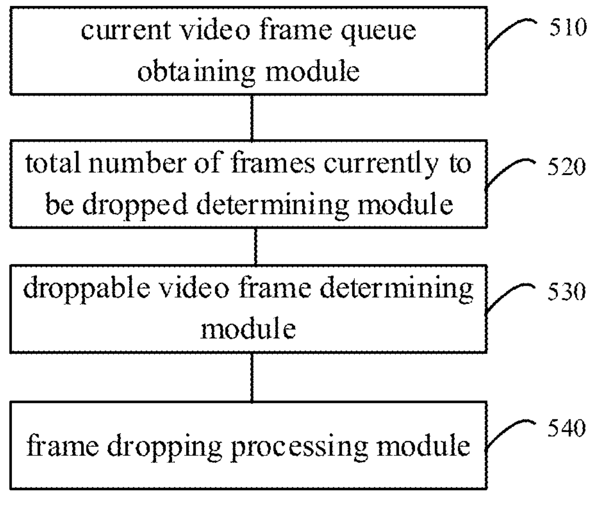
FIG. 5 is a structural schematic diagram of a frame dropping apparatus provided by embodiment four of the present disclosure.

FIG. 5 is a structural schematic diagram of a frame dropping apparatus provided by embodiment four of the present disclosure, may be applicable to situations in which frame dropping is performed during video transmission to ensure low latency, especially in application to live streaming scenarios in which frame dropping is performed on live video to be transmitted. As shown in FIG. 5, the apparatus includes a current video frame queue obtaining module 510, a total number of frames currently to be dropped determining module 520, a droppable video frame determining module 530, and a frame dropping processing module 540.

The current video frame queue obtaining module 510 is configured to obtain a current video frame queue currently to be sent; the total number of frames currently to be dropped determining module 520 is configured to determine a timeout video frame in the current video frame queue, and determine a total number of frames currently to be dropped corresponding to the current video frame queue based on a number of the timeout video frame and a number of frames yet to be dropped; the droppable video frame determining module is configured to determine a droppable video frame in the current video frame queue; and the frame dropping processing module is configured to determine a target droppable video frame from the droppable video frame based on the total number of frames currently to be dropped and a drop priority corresponding to the droppable video frame, and perform frame dropping processing on the target droppable video frame, where the drop priority is determined based on decoding reference information corresponding to the droppable video frame.

The technical solution of the embodiments of the present disclosure does not directly drop frames after determining the timeout video frame in the current video frame queue currently to be sent, but based on the number of the timeout video frame and the number of frames yet to be dropped, determines the total number of frames currently to be dropped corresponding to the current video frame queue, i.e., the total number of frames that need to be dropped in order to ensure low latency. By determining the droppable video frame in the current video frame queue, and determining the target droppable video frame from the respective droppable video frames based on the drop priority and the total number of frames currently to be dropped determined by the decoding reference information corresponding to the droppable video frames, and performing the frame dropping process, it is possible to eliminate the need to perform collective frame dropping, reduce the number of dropped frames without collective frame dropping in the case of ensuring low latency and avoiding the appearance of a blurred screen, avoid the situation that no data sent, improve the bandwidth utilization, and further improve the consistency of the video playing, and improve the user viewing experience.

On the basis of the above-mentioned technical solution, the apparatus further includes:

a priority determining module, configured to: if the droppable video frame is a key frame, determine the drop priority corresponding to the droppable video frame based on a preset key frame priority determination manner; if the droppable video frame is a reference frame, determine the drop priority corresponding to the droppable video frame based on a preset reference frame priority determination manner, where the reference frame refers to a video frame which is referred to by other video frames when decoding the other video frames; if the droppable video frame is a non-reference frame, determining the drop priority corresponding to the droppable video frame based on a preset non-reference frame priority determination manner, where the non-reference frame refers to a video frame which is not referred to by other video frames when decoding the other video frames.

On the basis of the above-mentioned technical solutions, in a same group of pictures, the key frame corresponds to a highest drop priority, the reference frame corresponds to a next drop priority, and the non-reference frame corresponds to a lowest drop priority; in the same group of pictures, a plurality of reference frames correspond decreasing drop priorities and a plurality of non-reference frames correspond to increasing drop priorities; key frames in different groups of pictures correspond to increasing drop priorities.

On the basis of the above-mentioned technical solutions, the priority determining module is further configured to:

determine the drop priority corresponding to the droppable video frame based on a number of current picture groups corresponding to the droppable video frame, a first preset reference value and a second preset reference value, where the first preset reference value is used to characterize a difference value between two drop priorities corresponding to key frames in adjacent two groups of pictures, and the second preset reference value is used to characterize an initial value of a drop priority corresponding to a key frame.

On the basis of the above-mentioned technical solutions, the droppable video frame determining module 530 is configured to:

if it is detected that at least one key frame is present in the current video frame queue, and that a last key frame is not a first-in-queue frame, treat each video frame before the last key frame in the current video frame queue as the droppable video frame.

On the basis of the above-mentioned technical solutions, the frame dropping processing module 540, including:

a first determining unit configured to, if it is detected that a number of the droppable video frame is greater than the total number of frames currently to be dropped, determine the target droppable video frame from the droppable video frame according to the drop priority corresponding to the droppable video frame and the total number of frames currently to be dropped;

a second determining unit configured to, if it is detected that the number of the droppable video frame is less than or equal to the total number of frames currently to be dropped, take each droppable video frame as the target droppable video frame.

On the basis of the above-mentioned technical solutions, the first determining unit is configured to:

rank a drop order of the droppable video frame based on the drop priority corresponding to the droppable video frame, and take the droppable video frame dropped first with a number equal to the total number of frames currently to be dropped as the target droppable video frame.

On the basis of the above-mentioned technical solutions, the droppable video frame determining module 530 is further configured to:

if it is detected that no key frame is present in the current video frame queue, or that only one key frame is present as a first-in-queue frame, treat each video frame in the current video frame queue as the droppable video frame.

On the basis of the above-mentioned technical solutions, the frame dropping processing module 540, further including:

a remaining video frame number determining unit, configured to determine a number of a remaining video frame that have not been written to a current group of pictures in the current video frame queue based on a number of video frames contained by a group of pictures;

a first frame drop unit, configured to if the number of the remaining video frame is less than the total number of frames currently to be dropped, determine a number of remaining frames to be dropped, and determine a target droppable video frame with a number equal to the number of remaining frames to be dropped from the droppable video frame based on the drop priority corresponding to the droppable video frame, and perform frame dropping processing on the target droppable video frame;

a second frame drop unit configured to perform frame dropping processing on the remaining video frame corresponding to the current group of pictures as the target droppable video frame.

On the basis of the above-mentioned technical solutions, the second frame drop unit is configured to:

determine a maximum drop priority of the target droppable video frame with the number equal to the number of remaining frames to be dropped; if a drop priority corresponding to a video frame that is newly received is less than the maximum drop priority, determine that the video frame is the remaining video frame corresponding to the current group of pictures and inhibiting the video frame from being written into a video frame queue to be sent.

On the basis of the above-mentioned technical solutions, the apparatus further includes:

a delay module, configured to, after performing frame dropping processing on the target droppable video frame, perform a delay processing on a current timeout moment corresponding to the timeout video frame based on a preset delay duration, and updating the current timeout moment.

On the basis of the above-mentioned technical solutions, the apparatus further includes:

a number of frames yet to be dropped updating module, configured to determine and updating the number of frames yet to be dropped based on the total number of frames currently to be dropped and a number of the target droppable video frame.

The frame dropping apparatus according to the embodiments of the present disclosure may perform the frame loss method according to any of the embodiments of the present disclosure, and may have corresponding functional blocks for performing the frame loss method.

It should be noted that the embodiments of the above-mentioned frame dropping apparatus include units and modules which are divided only according to functional logic, but are not limited to the above-mentioned division as long as the corresponding functions can be realized; In addition, the specific names of the respective functional units are also merely for convenience of distinguishing from each other, and are not used to limit the protection scope of the present disclosure.

Example Five

Figure 6:
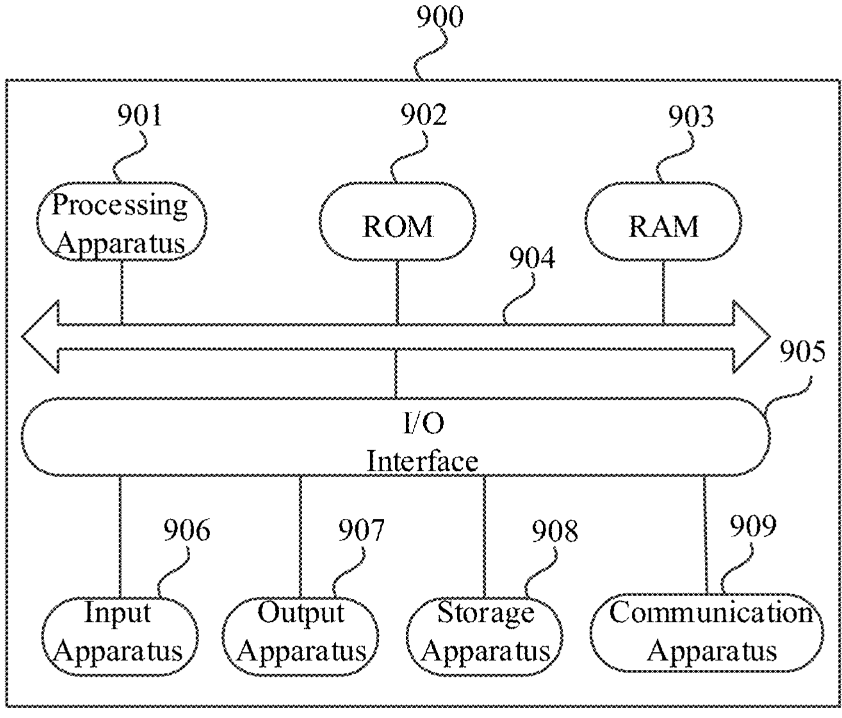
FIG. 6 is a structural schematic diagram of a server provided by embodiment five of the present disclosure.

Reference is now made to FIG. 6, which illustrates a block diagram of a server 900 suitable for use in implementing embodiments of the present disclosure. The server illustrated in FIG. 6 is merely one example and should not pose any limitation on the scope of use or functionality of embodiments of the disclosure.

As shown in FIG. 6, the server 900 may include a processing device (e.g., a central processor, a graphics processor, etc.) 901 that may execute various appropriate actions and processes in accordance with a program stored in a Read-Only Memory (ROM) 902 or a program loaded into a Random Access Memory (RAM) 903 from a storage device 908. In the RAM 903, various programs and data required for operation of the server 900 are also stored. The processing device 901, the ROM 902 and the RAM 903 are connected to each other by a bus 904. An Input/Output (I/O) interface 905 is also connected to the bus 904.

Generally, the following devices may be connected to the I/O interface 905: input devices 906 including, for example, touchscreens, touchpads, keyboards, mice, cameras, microphones, accelerometers, gyroscopes, etc.; An output device 907 including, for example, a Liquid Crystal Display (LCD), a speaker, a vibrator, or the like; Storage 908 including, for example, magnetic tape, hard disk, etc.; And a communication device 909. The communication means 909 may allow the server 900 to engage in wireless or wired communication with other devices to exchange data. While FIG. 6 illustrates server 900 with various devices, it should be understood that it is not required that all of the illustrated devices be implemented or provided. More or fewer devices may alternatively be implemented or provided.

In particular, according to an embodiment of the present disclosure, the processes described above-mentioned with reference to the flow charts may be implemented as a computer software program. For example, embodiments of the present disclosure include a computer program product including a computer program carried on a non-transitory computer readable medium, the computer program containing program code for performing the methods illustrated by the flow charts. In such an embodiment, the computer program may be downloaded and installed from the network via the communication device 909, or installed from the storage device 908, or installed from the ROM 902. When this computer program is executed by the processing device 901, the above-mentioned functions defined in the methods of the embodiments of the present disclosure are performed.

The server provided by the embodiments of the present disclosure belongs to the same inventive concept as the frame loss method provided by the above-mentioned embodiments, technical details that are not elaborately described in the embodiments of the present disclosure may be referred to the above-mentioned embodiments.

Example Six

An embodiment of the present disclosure provides a computer storage medium having stored thereon a computer program which, when executed by a processor, implements the frame loss method provided by the above-mentioned embodiment.

It should be noted that the above-mentioned computer-readable medium of the present disclosure may be a computer-readable signal medium or a computer-readable storage medium or any combination of both. A computer readable storage medium may be, for example, but not limited to, an electronic, magnetic, optical, electromagnetic, infrared, or semiconductor system, apparatus, or device, or any combination of the foregoing. More specific examples of a computer readable storage medium may include, but are not limited to, an electrical connection having one or more wires, a portable computer diskette, a hard disk, a random access memory (RAM), a read-only memory (ROM), an Erasable Programmable Read-Only Memory (EPROM) or Flash memory), an optical fiber, a portable Compact Disc Read-Only Memory (CD-ROM), an optical storage device, a magnetic storage device, or any suitable combination of the foregoing. In the present disclosure, a computer readable storage medium may be any tangible medium that contains, or stores a program for use by or in connection with an instruction execution system, apparatus, or device. While in the present disclosure, a computer readable signal medium may include a propagated data signal with computer readable program code embodied therein, either in baseband or as part of a carrier wave. Such a propagated data signal may take many forms, including, but not limited to, an electromagnetic signal, an optical signal, or any suitable combination of the foregoing. A computer readable signal medium may also be any computer readable medium that is not a computer readable storage medium that can communicate, propagate, or transport a program for use by or in connection with an instruction execution system, apparatus, or device. Program code embodied on a computer readable medium may be sent using any appropriate medium, including but not limited to wireline, fiber optic cable, Radio Frequency (RF), etc., or any suitable combination of the foregoing.

In some implementation, the clients, servers may communicate using any currently known or future developed network protocol, such as HTTP, and may be interconnected with any form or medium of digital data communication (e.g., a communication network). Examples of communication networks include a Local Area Network (LAN), a Wide Area Network (WAN), an Internet (e.g., the Internet), and a peer-to-peer network (e.g., an ad hoc peer-to-peer network), as well as any currently known or future developed network.

The above-mentioned computer-readable medium may be included in the above-mentioned server; It may also exist separately and not fit into the server.

The computer-readable medium carries at least one program that, when executed by the server, causes the server to: obtain a current video frame queue currently to be sent; determine a timeout video frame in the current video frame queue, and determine a total number of frames currently to be dropped corresponding to the current video frame queue based on a number of the timeout video frame and a number of frames yet to be dropped; determine a droppable video frame in the current video frame queue; determine a target droppable video frame from the droppable video frame based on the total number of frames currently to be dropped and a drop priority corresponding to the droppable video frame, and perform frame dropping processing on the target droppable video frame, where the drop priority is determined based on decoding reference information corresponding to the droppable video frame.

Computer program code for carrying out operations of the present disclosure may be written in one or more programming languages or combinations thereof, including without limitation an object oriented programming language such as Java, Smalltalk, C++ and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the scenario involving a remote computer, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or operations or combinations of special purpose hardware and computer instructions.

The units described in the embodiments of the present disclosure may be implemented by means of software or by means of hardware. Therein, the name of a unit does not in some cases constitute a limitation on the unit itself, for example, an editable content display unit may also be described as an "editing unit".

The functionality described above-mentioned herein can be performed, at least in part, by one or more hardware logic components. For example, and without limitation, illustrative types of hardware logic components that can be used include Field-programmable Gate Arrays (FPGAs), Application Specific Integrated Circuits (ASICs), Application Specific Standard Parts (ASSPs), System on Chip (SOCs), Complex Programmable Logic Devices (CPLDs), etc.

In the context of the present disclosure, a machine readable medium may be a tangible medium that can contain, or store a program for use by or in connection with an instruction execution system, apparatus, or device. The machine readable medium may be a machine readable signal medium or a machine readable storage medium. A machine readable medium may include, but is not limited to, an electronic, magnetic, optical, electromagnetic, infrared, or semiconductor system, apparatus, or device, or any suitable combination of the foregoing. More specific examples of the machine readable storage medium would include an electrical connection based on one or more wires, a portable computer diskette, a hard disk, a random access memory (RAM), a read-only memory (ROM), an erasable programmable read-only memory (EPROM or Flash memory), an optical fiber, a convenient compact disc read-only memory (CD-ROM), an optical storage device, a magnetic storage device, or any suitable combination of the foregoing.

According to at least one embodiment of the present disclosure, [Example One] provides a frame dropping method, including:

obtaining a current video frame queue currently to be sent;

determining a timeout video frame in the current video frame queue, and determining a total number of frames currently to be dropped corresponding to the current video frame queue based on a number of the timeout video frame and a number of frames yet to be dropped;

determining a droppable video frame in the current video frame queue; and determining a target droppable video frame from the droppable video frame based on the total number of frames currently to be dropped and a drop priority corresponding to the droppable video frame, and performing frame dropping processing on the target droppable video frame, where the drop priority is determined based on decoding reference information corresponding to the droppable video frame.

According to at least one embodiment of the present disclosure, [Example Two] provides a frame dropping method, further including:

optionally, determining the drop priority based on decoding reference information corresponding to the droppable video frame includes:

in a case where the droppable video frame is a key frame, determining the drop priority corresponding to the droppable video frame based on a preset key frame priority determination manner;

in a case where the droppable video frame is a reference frame, determining the drop priority corresponding to the droppable video frame based on a preset reference frame priority determination manner, where the reference frame refers to a video frame which is referred to by other video frames when decoding the other video frames;

in a case where the droppable video frame is a non-reference frame, determining the drop priority corresponding to the droppable video frame based on a preset non-reference frame priority determination manner, where the non-reference frame refers to a video frame which is not referred to by other video frames when decoding the other video frames.

According to at least one embodiment of the present disclosure, [Example Three] provides a frame dropping method, further including:

in a same group of pictures, the key frame corresponds to a highest drop priority, the reference frame corresponds to a next drop priority, and the non-reference frame corresponds to a lowest drop priority;

in the same group of pictures, a plurality of reference frames correspond decreasing drop priorities and a plurality of non-reference frames correspond to increasing drop priorities;

key frames in different groups of pictures correspond to increasing drop priorities.

According to at least one embodiment of the present disclosure, [Example Four] provides a frame dropping method, further including:

optionally, the determining the drop priority corresponding to the droppable video frame based on the preset key frame priority determination manner includes:

determining the drop priority corresponding to the droppable video frame based on a number of current picture groups corresponding to the droppable video frame, a first preset reference value and a second preset reference value, where the first preset reference value is used to characterize a difference value between two drop priorities corresponding to key frames in adjacent two groups of pictures, and the second preset reference value is used to characterize an initial value of a drop priority corresponding to a key frame.

According to at least one embodiment of the present disclosure, [Example Five] provides a frame dropping method, further including:

optionally, the determining the droppable video frame in the current video frame queue includes:

in response to detecting that at least one key frame is present in the current video frame queue, and that a last key frame is not a first-in-queue frame, treating each video frame before the last key frame in the current video frame queue as the droppable video frame.

According to at least one embodiment of the present disclosure, [Example Six] provides a frame dropping method, further including:

optionally, the determining the target droppable video frame from the droppable video frame based on the total number of frames currently to be dropped and the drop priority corresponding to the droppable video frame includes:

in response to detecting that a number of the droppable video frame is greater than the total number of frames currently to be dropped, determining the target droppable video frame from the droppable video frame according to the drop priority corresponding to the droppable video frame and the total number of frames currently to be dropped;

in response to detecting that the number of the droppable video frame is less than or equal to the total number of frames currently to be dropped, taking each droppable video frame as the target droppable video frame.

According to at least one embodiment of the present disclosure, [Example Seven] provides a frame dropping method, further including:

optionally, the determining the target droppable video frame from the droppable video frame according to the drop priority corresponding to the droppable video frame and the total number of frames currently to be dropped includes:

ranking a drop order of the droppable video frame based on the drop priority corresponding to the droppable video frame, and taking the droppable video frame dropped first with a number equal to the total number of frames currently to be dropped as the target droppable video frame.

According to at least one embodiment of the present disclosure, [Example Eight] provides a frame dropping method, further including:

optionally, the determining the droppable video frame in the current video frame queue includes:

in response to detecting that no key frame is present in the current video frame queue, or that only one key frame is present as a first-in-queue frame, treating each video frame in the current video frame queue as the droppable video frame.

According to at least one embodiment of the present disclosure, [Example Nine] provides a frame dropping method, further including:

optionally, the determining the target droppable video frame from the droppable video frame based on the total number of frames currently to be dropped and the drop priority corresponding to the droppable video frame includes:

determining a number of a remaining video frame in a current group of pictures in the current video frame queue that have not been written based on a number of video frames contained by a group of pictures;

in response to the number of the remaining video frame being less than the total number of frames currently to be dropped, determining a number of remaining frames to be dropped, and determining a target droppable video frame with a number equal to the number of remaining frames to be dropped from the droppable video frame based on the drop priority corresponding to the droppable video frame, and performing frame dropping processing on the target droppable video frame;

performing frame dropping processing on the remaining video frame corresponding to the current group of pictures as the target droppable video frame.

According to at least one embodiment of the present disclosure, [Example Ten] provides a frame dropping method, further including:

optionally, the performing frame dropping processing on the remaining video frame corresponding to the current group of pictures as the target droppable video frame includes:

determining a maximum drop priority of the target droppable video frame with the number equal to the number of remaining frames to be dropped;

in response to a drop priority corresponding to a video frame that is newly received being less than the maximum drop priority, determining that the video frame is the remaining video frame corresponding to the current group of pictures and inhibiting the video frame from being written into a video frame queue to be sent.

According to at least one embodiment of the present disclosure, [Example Eleven] provides a frame dropping method, further including:

optionally, after determining the timeout video frame in the current video frame queue, further including:

performing a delay processing on a current timeout moment corresponding to the timeout video frame based on a preset delay duration, and updating the current timeout moment.

According to at least one embodiment of the present disclosure, [Example Twelve] provides a frame dropping method, further including:

optionally, after performing frame dropping processing on the target droppable video frame, further including:

determining and updating the number of frames yet to be dropped based on the total number of frames currently to be dropped and a number of the target droppable video frame.

According to at least one embodiment of the present disclosure, [Example Thirteen] provides a frame dropping apparatus, including:

a current video frame queue obtaining module, configured to obtain a current video frame queue currently to be sent;

a total number of frames currently to be dropped determining module, configured to determine a timeout video frame in the current video frame queue, and determine a total number of frames currently to be dropped corresponding to the current video frame queue based on a number of the timeout video frame and a number of frames yet to be dropped;

a droppable video frame determining module, configured to determine a droppable video frame in the current video frame queue; and a frame dropping processing module, configured to determine a target droppable video frame from the droppable video frame based on the total number of frames currently to be dropped and a drop priority corresponding to the droppable video frame, and perform frame dropping processing on the target droppable video frame, where the drop priority is determined based on decoding reference information corresponding to the droppable video frame.

Additionally, although operations are depicted in a particular order, it should not be understood that these operations are required to be performed in a specific order as illustrated or in a sequential order. Under certain circumstances, multitasking and parallel processing may be advantageous. Likewise, although the above-mentioned discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

The invention claimed is:

1. A frame dropping method, comprising:

obtaining a current video frame queue currently to be sent;

determining a timeout video frame in the current video frame queue;

determining a total number of frames currently to be dropped corresponding to the current video frame queue based on a number of the timeout video frame and a number of frames that should be dropped in a previous video frame queue, but have not yet been dropped;

detecting a droppable video frame in the current video frame queue based on a result of detecting whether there is at least one key frame in the current video frame queue and whether a last key frame in the current video frame queue is a first-in-queue frame;

identifying a target droppable video frame from the droppable video frame based on the total number of frames currently to be dropped and a drop priority corresponding to the droppable video frame, wherein the drop priority is determined based on decoding reference information corresponding to the droppable video frame; and performing frame dropping processing on the target droppable video frame.

2. The method according to claim 1, wherein determining the drop priority based on decoding reference information corresponding to the droppable video frame comprises:

in a case where the droppable video frame is a key frame, determining the drop priority corresponding to the droppable video frame based on a preset key frame priority determination manner;

in a case where the droppable video frame is a reference frame, determining the drop priority corresponding to the droppable video frame based on a preset reference frame priority determination manner, wherein the reference frame refers to a video frame which is referred to by other video frames when decoding the other video frames;

in a case where the droppable video frame is a non-reference frame, determining the drop priority corresponding to the droppable video frame based on a preset non-reference frame priority determination manner, wherein the non-reference frame refers to a video frame which is not referred to by other video frames when decoding the other video frames.

3. The method according to claim 2, wherein in a same group of pictures, the key frame corresponds to a highest drop priority, the reference frame corresponds to a next drop priority, and the non-reference frame corresponds to a lowest drop priority;

in the same group of pictures, a plurality of reference frames correspond to decreasing drop priorities and a plurality of non-reference frames correspond to increasing drop priorities;

key frames in different groups of pictures correspond to increasing drop priorities.

4. The method according to claim 2, wherein the determining the drop priority corresponding to the droppable video frame based on the preset key frame priority determination manner comprises:

determining the drop priority corresponding to the droppable video frame based on a number of current picture groups corresponding to the droppable video frame, a first preset reference value and a second preset reference value, wherein the first preset reference value is used to characterize a difference value between two drop priorities corresponding to key frames in adjacent two groups of pictures, and the second preset reference value is used to characterize an initial value of a drop priority corresponding to a key frame.

5. The method according to claim 1, wherein the determining the droppable video frame in the current video frame queue comprises:

in response to detecting that at least one key frame is present in the current video frame queue, and that a last key frame is not a first-in-queue frame, treating each video frame before the last key frame in the current video frame queue as the droppable video frame.

6. The method according to claim 5, wherein the determining the target droppable video frame from the droppable video frame based on the total number of frames currently to be dropped and the drop priority corresponding to the droppable video frame comprises:

in response to detecting that a number of the droppable video frame is greater than the total number of frames currently to be dropped, determining the target droppable video frame from the droppable video frame according to the drop priority corresponding to the droppable video frame and the total number of frames currently to be dropped;

in response to detecting that the number of the droppable video frame is less than or equal to the total number of frames currently to be dropped, taking each droppable video frame as the target droppable video frame.

7. The method according to claim 6, wherein the determining the target droppable video frame from the droppable video frame according to the drop priority corresponding to the droppable video frame and the total number of frames currently to be dropped comprises:

ranking a drop order of the droppable video frame based on the drop priority corresponding to the droppable video frame.

8. The method according to claim 1, wherein the determining the droppable video frame in the current video frame queue comprises:

in response to detecting that no key frame is present in the current video frame queue, or that only one key frame is present as a first-in-queue frame, treating each video frame in the current video frame queue as the droppable video frame.

9. The method according to claim 8, wherein the determining the target droppable video frame from the droppable video frame based on the total number of frames currently to be dropped and the drop priority corresponding to the droppable video frame comprises:

determining a number of a remaining video frame in a current group of pictures in the current video frame queue that have not been written based on a number of video frames contained by a group of pictures;

in response to the number of the remaining video frame being less than the total number of frames currently to be dropped, determining a number of remaining frames to be dropped, and determining a target droppable video frame with a number equal to the number of remaining frames to be dropped from the droppable video frame based on the drop priority corresponding to the droppable video frame, and performing frame dropping processing on the target droppable video frame;

performing frame dropping processing on the remaining video frame corresponding to the current group of pictures as the target droppable video frame.

10. The method according to claim 9, wherein the performing frame dropping processing on the remaining video frame corresponding to the current group of pictures as the target droppable video frame comprises:

determining a maximum drop priority of the target droppable video frame with the number equal to the number of remaining frames to be dropped;

in response to a drop priority corresponding to a video frame that is newly received being less than the maximum drop priority, determining that the video frame is the remaining video frame corresponding to the current group of pictures and inhibiting the video frame from being written into a video frame queue to be sent.

11. The method according to claim 1, after determining the timeout video frame in the current video frame queue, further comprising:

performing a delay processing on a current timeout moment corresponding to the timeout video frame based on a preset delay duration, and updating the current timeout moment.

12. The method according to claim 1, after performing frame dropping processing on the target droppable video frame, further comprising:

determining and updating the number of frames yet to be dropped based on the total number of frames currently to be dropped and a number of the target droppable video frame.

13. A server, comprising:

at least one processor;

a memory, configured to store at least one program;

the at least one program, when executed by at least one processor, causes at least one processor to implement operations, which the operations comprise:

obtaining a current video frame queue currently to be sent;

determining a timeout video frame in the current video frame queue;

determining a total number of frames currently to be dropped corresponding to the current video frame queue based on a number of the timeout video frame and a number of frames that should be dropped in a previous video frame queue, but have not yet been dropped;

detecting a droppable video frame in the current video frame queue based on a result of detecting whether there is at least one key frame in the current video frame queue and whether a last key frame in the current video frame queue is a first-in-queue frame;

identifying a target droppable video frame from the droppable video frame based on the total number of frames currently to be dropped and a drop priority corresponding to the droppable video frame, wherein the drop priority is determined based on decoding reference information corresponding to the droppable video frame; and performing frame dropping processing on the target droppable video frame.

14. The server according to claim 13, wherein determining the drop priority based on decoding reference information corresponding to the droppable video frame comprises:

in a case where the droppable video frame is a key frame, determining the drop priority corresponding to the droppable video frame based on a preset key frame priority determination manner;

in a case where the droppable video frame is a reference frame, determining the drop priority corresponding to the droppable video frame based on a preset reference frame priority determination manner, wherein the reference frame refers to a video frame which is referred to by other video frames when decoding the other video frames;

in a case where the droppable video frame is a non-reference frame, determining the drop priority corresponding to the droppable video frame based on a preset non-reference frame priority determination manner, wherein the non-reference frame refers to a video frame which is not referred to by other video frames when decoding the other video frames.

15. The server according to claim 14, wherein in a same group of pictures, the key frame corresponds to a highest drop priority, the reference frame corresponds to a next drop priority, and the non-reference frame corresponds to a lowest drop priority;

in the same group of pictures, a plurality of reference frames correspond to decreasing drop priorities and a plurality of non-reference frames correspond to increasing drop priorities;

key frames in different groups of pictures correspond to increasing drop priorities.

16. The server according to claim 14, wherein the determining the drop priority corresponding to the droppable video frame based on the preset key frame priority determination manner comprises:

determining the drop priority corresponding to the droppable video frame based on a number of current picture groups corresponding to the droppable video frame, a first preset reference value and a second preset reference value, wherein the first preset reference value is used to characterize a difference value between two drop priorities corresponding to key frames in adjacent two groups of pictures, and the second preset reference value is used to characterize an initial value of a drop priority corresponding to a key frame.

17. The server according to claim 13, wherein the determining the droppable video frame in the current video frame queue comprises:

in response to detecting that at least one key frame is present in the current video frame queue, and that a last key frame is not a first-in-queue frame, treating each video frame before the last key frame in the current video frame queue as the droppable video frame.

18. The server according to claim 17, wherein the determining the target droppable video frame from the droppable video frame based on the total number of frames currently to be dropped and the drop priority corresponding to the droppable video frame comprises:

in response to detecting that a number of the droppable video frame is greater than the total number of frames currently to be dropped, determining the target droppable video frame from the droppable video frame according to the drop priority corresponding to the droppable video frame and the total number of frames currently to be dropped;

in response to detecting that the number of the droppable video frame is less than or equal to the total number of frames currently to be dropped, taking each droppable video frame as the target droppable video frame.

19. The server according to claim 18, wherein the determining the target droppable video frame from the droppable video frame according to the drop priority corresponding to the droppable video frame and the total number of frames currently to be dropped comprises:

ranking a drop order of the droppable video frame based on the drop priority corresponding to the droppable video frame.

20. A non-transitory computer-readable storage medium having stored thereon a computer program which, when executed by a processor, implements a frame dropping method wherein the method comprises:

obtaining a current video frame queue currently to be sent;

determining a timeout video frame in the current video frame queue;

determining a total number of frames currently to be dropped corresponding to the current video frame queue based on a number of the timeout video frame and a number of frames that should be dropped in a previous video frame queue, but have not yet been dropped;

detecting a droppable video frame in the current video frame queue based on a result of detecting whether there is at least one key frame in the current video frame queue and whether a last key frame in the current video frame queue is a first-in-queue frame;

identifying a target droppable video frame from the droppable video frame based on the total number of frames currently to be dropped and a drop priority corresponding to the droppable video frame, wherein the drop priority is determined based on decoding reference information corresponding to the droppable video frame; and performing frame dropping processing on the target droppable video frame.

* * * * *